US012797754B2

(12) United States Patent
Green et al.

(10) Patent No.: US 12,797,754 B2
(45) Date of Patent: Nov. 17, 2026

(54) DATA PROCESSING APPARATUS AND METHOD

(71) Applicant: Sony Interactive Entertainment Inc., Tokyo (JP)

(72) Inventors: Lawrence Green, London (GB); Maria Chiara Monti, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 194 days.

(21) Appl. No.: 18/584,041

(22) Filed: Feb. 22, 2024

(65) Prior Publication Data

US 2024/0293754 A1 Sep. 5, 2024

(30) Foreign Application Priority Data

Mar. 2, 2023 (GB) ..................................... 2303097

(51) Int. Cl.
*A63F 13/00* (2014.01)
*A63F 13/87* (2014.01)

(52) U.S. Cl.
CPC .................................... *A63F 13/87* (2014.09)

(58) Field of Classification Search
None
See application file for complete search history.

(56) References Cited

U.S. PATENT DOCUMENTS 6,807,562 B1 * 10/2004 Pennock ................ H04L 51/04
709/204
8,676,273 B1 * 3/2014 Fujisaki ................ H04M 1/724
455/418
9,392,355 B1 * 7/2016 Kulavik .................. H04R 5/04
10,293,260 B1 * 5/2019 Evans .................. A63F 13/424
10,864,447 B1 * 12/2020 Willette ................. A63F 13/86
11,128,636 B1 * 9/2021 Jorasch ................ A61B 5/6803
2002/0199096 A1 * 12/2002 Wenocur ............. G06Q 10/107
713/153
2003/0041110 A1 * 2/2003 Wenocur .............. H04L 63/126
709/206
2004/0153557 A1 * 8/2004 Shochet ................ H04L 51/212
709/205

(Continued)

OTHER PUBLICATIONS

Combined Search and Examination Report for corresponding GB Application No. 2303097.6, 6 pages, Aug. 29, 2023.

*Primary Examiner* — Paul A D'Agostino
(74) *Attorney, Agent, or Firm* — Kilpatrick Townsend & Stockton LLP

(57) ABSTRACT

A data processing apparatus includes circuitry configured to: detect a speech input from a first user playing a video game; transmit data representing the speech input to a second data processing apparatus using a first communication channel for output to a second user playing the video game with the first user; determine if a private conversation mode is enabled; if the private conversation mode is not enabled, transmit data representing the speech input to a third data processing apparatus using a second communication channel for output to a third user watching but not playing the video game with the first and second users; and if the private conversation mode is enabled, prevent transmission of data representing the speech input to the third data processing apparatus using the second communication channel.

12 Claims, 12 Drawing Sheets

(56) References Cited

U.S. PATENT DOCUMENTS

2005/0010952 A1* 1/2005 Gleissner ............... G09B 17/00 725/135
2005/0181878 A1* 8/2005 Danieli ............... G07F 17/3276 463/42
2005/0245317 A1* 11/2005 Arthur .................... A63F 13/12 463/42
2006/0095262 A1* 5/2006 Danieli ................... G10L 21/00 704/E21.001
2009/0204906 A1* 8/2009 Irving ...................... H04N 7/15 715/753
2009/0303984 A1* 12/2009 Clark .................... H04L 63/104 370/352
2010/0069155 A1* 3/2010 Schwartz ................ G07F 17/32 463/42
2010/0162325 A1* 6/2010 Bonar ................ B64D 11/0624 725/76
2011/0161999 A1* 6/2011 Klappert ............ H04N 21/4318 382/201
2012/0108221 A1* 5/2012 Thomas ............ H04M 1/72403 455/418
2012/0198490 A1* 8/2012 Mertens ............. H04N 21/4318 725/24
2012/0259639 A1* 10/2012 Yeh ..................... G06F 3/04842 704/E15.001
2013/0123019 A1* 5/2013 Sullivan .................. A63F 13/35 463/42
2013/0145400 A1* 6/2013 Chang ................ H04N 21/8405 725/53
2013/0196761 A1* 8/2013 Doorgeest ............... A63F 13/87 463/31
2013/0222597 A1* 8/2013 Brink ................. H04N 21/4784 348/157
2014/0098010 A1* 4/2014 Travis ................ G02B 27/0093 345/32
2014/0195675 A1* 7/2014 Silver ..................... H04L 67/02 709/224
2014/0313277 A1* 10/2014 Yarosh ................... H04N 7/144 348/14.08
2015/0070516 A1* 3/2015 Shoemake ......... H04N 21/4542 348/207.11
2016/0184708 A1* 6/2016 Ziaja .................. H04N 21/2407 463/31
2016/0236097 A1* 8/2016 Sullivan ................ A63F 13/424
2017/0003740 A1* 1/2017 Verfaillie ................ A63F 13/87
2017/0118495 A1* 4/2017 Yang ................ H04N 21/23424
2017/0182426 A1* 6/2017 Loeb ....................... A63F 13/87
2017/0251336 A1* 8/2017 Keller .................. H04N 23/611
2017/0368454 A1* 12/2017 Sivak ...................... A63F 13/35
2018/0063326 A1* 3/2018 Tichauer ............. H04M 3/4936
2018/0221774 A1* 8/2018 Sullivan ................ A63F 13/352
2018/0307687 A1* 10/2018 Natkin .................. G06F 16/248
2018/0351756 A1* 12/2018 Dave .................. H04N 21/4788
2018/0353856 A1* 12/2018 Karacal ................... A63F 13/87
2019/0104235 A1* 4/2019 Sarkar .................. H04N 21/816
2019/0147699 A1* 5/2019 Malek ................. G07F 17/3255 463/20
2019/0182554 A1* 6/2019 Schupak ............ H04N 21/4316
2019/0270018 A1* 9/2019 Evans ..................... A63F 13/79
2019/0314728 A1* 10/2019 Sullivan ................ A63F 13/355
2019/0391637 A1* 12/2019 Taylor ..................... G06F 3/013
2020/0127960 A1* 4/2020 Khawand .......... H04M 1/72448
2020/0133983 A1* 4/2020 Bleda ..................... G06N 3/096
2020/0162796 A1* 5/2020 Azuolas ............. H04N 21/4788
2020/0186851 A1* 6/2020 Kahn ................... H04N 21/233
2020/0202668 A1* 6/2020 Cotta .................. G07F 17/3244
2020/0275158 A1* 8/2020 Gaur .................... H04N 21/251
2020/0289946 A1* 9/2020 Thielbar ........... G06F 16/90328
2020/0326776 A1* 10/2020 Taylor ..................... A63F 13/87
2020/0335090 A1* 10/2020 Freed ...................... A63F 13/75
2020/0391122 A1* 12/2020 Hamilton ............ A63F 13/5252
2021/0077904 A1* 3/2021 Yen ..................... A63F 13/5255
2021/0082404 A1* 3/2021 Sanders .................. G10L 15/22
2021/0286502 A1* 9/2021 Lemay .................... G06F 3/011
2021/0304773 A1* 9/2021 Kumar .................... G10L 17/00
2021/0329338 A1* 10/2021 Khov .................. G06F 16/4393
2021/0339134 A1* 11/2021 Knoppert ................ A63F 13/26
2021/0397971 A1* 12/2021 Pardeshi ................ G06N 3/047
2021/0399911 A1* 12/2021 Jorasch ............... H04L 12/1818
2025/0356725 A1* 11/2025 Nowak ............... G07F 17/3225

* cited by examiner

DATA PROCESSING APPARATUS AND METHOD

BACKGROUND

Field of the Disclosure

This disclosure relates to a data processing apparatus and method.

Description of the Related Art

The "background" description provided is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

In electronic sports (or "esports"), a group of players playing an online multiplayer video game together may share a live stream of the game with an audience. The live stream may include the video output of the video game and/or the audio output of the video game as from the perspective of one or more of the players.

As well as the audio output of the video game itself (e.g. sound effects, in-game background music, character speech, etc.), the live stream may also include an audio output of the players themselves as they converse with each other, for example, over gaming headsets. This can improve the experience of viewers of the live stream since, for example, they are able to experience emotions of the individual players.

However, it is not always desirable for everything discussed by the players to be heard by the audience. For example, if one of the players wishes to share some personal information with the other players, they may not wish this information to be shared more widely (especially with strangers in a live stream audience). As another example, if the players are playing together as a team against another tea of players, they may wish to discuss a particular gaming strategy but not want this information to be shared more widely in case the information gets back to a player of the opposing team.

There is therefore a desire for improved control and flexibility in allowing players engaged in live streaming to choose when to share their conversation with the audience.

SUMMARY

The present disclosure is defined by the claims.

BRIEF DESCRIPTION OF THE DRAWINGS

Non-limiting embodiments and advantages of the present disclosure are explained with reference to the following detailed description taken in conjunction with the accompanying drawings, wherein.

Like reference numerals designate identical or corresponding parts throughout the drawings.

DETAILED DESCRIPTION OF THE EMBODIMENTS

Figure 1:
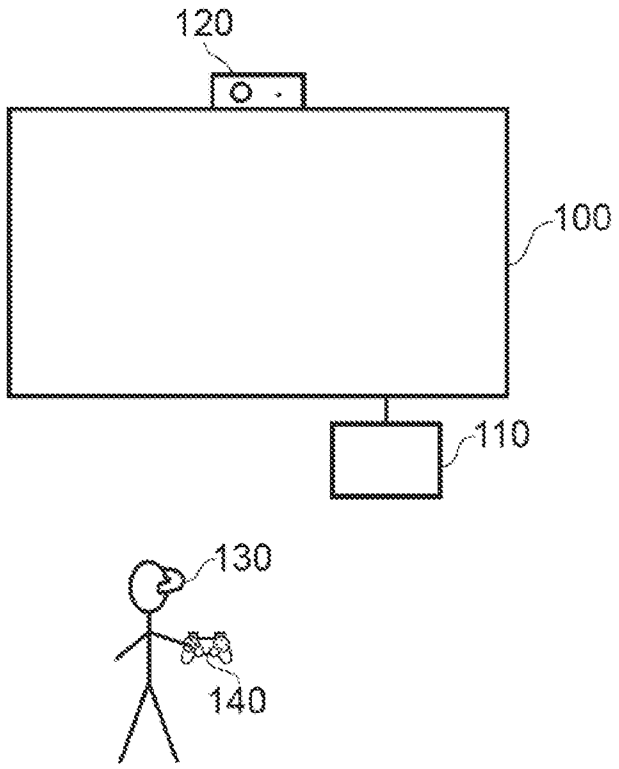
FIG. 1 schematically shows an example entertainment system.

FIG. 1 schematically illustrates an entertainment system suitable for implementing one or more of the embodiments of the present disclosure. Any suitable combination of devices and peripherals may be used to implement embodiments of the present disclosure, rather than being limited only to the configuration shown.

A display device 100 (e.g. a television or monitor), associated with a games console 110, is used to display content to one or more users. A user is someone who interacts with the displayed content, such as a player of a game, or, at least, someone who views the displayed content. A user who views the displayed content without interacting with it may be referred to as a viewer. This content may be a video game, for example, or any other content such as a movie or any other video content. The games console 110 is an example of a content providing device or entertainment device; alternative, or additional, devices may include computers, mobile phones, set-top boxes, and physical media playback devices, for example. In some embodiments the content may be obtained by the display device itself—for instance, via a network connection or a local hard drive.

One or more video and/or audio capture devices (such as the integrated camera and microphone 120) may be provided to capture images and/or audio in the environment of the display device. While shown as a separate unit in FIG. 1, it is considered that such devices may be integrated within one or more other units (such as the display device 100 or the games console 110 in FIG. 1).

In some implementations, an additional or alternative display device such as a head-mountable display (HMD) 130 may be provided. Such a display can be worn on the head of a user, and is operable to provide augmented reality or virtual reality content to a user via a near-eye display screen. A user may be further provided with a video game controller 140 which enables the user to interact with the games console 110. This may be through the provision of buttons, motion sensors, cameras, microphones, and/or any other suitable method of detecting an input from or action by a user.

Figure 2A:
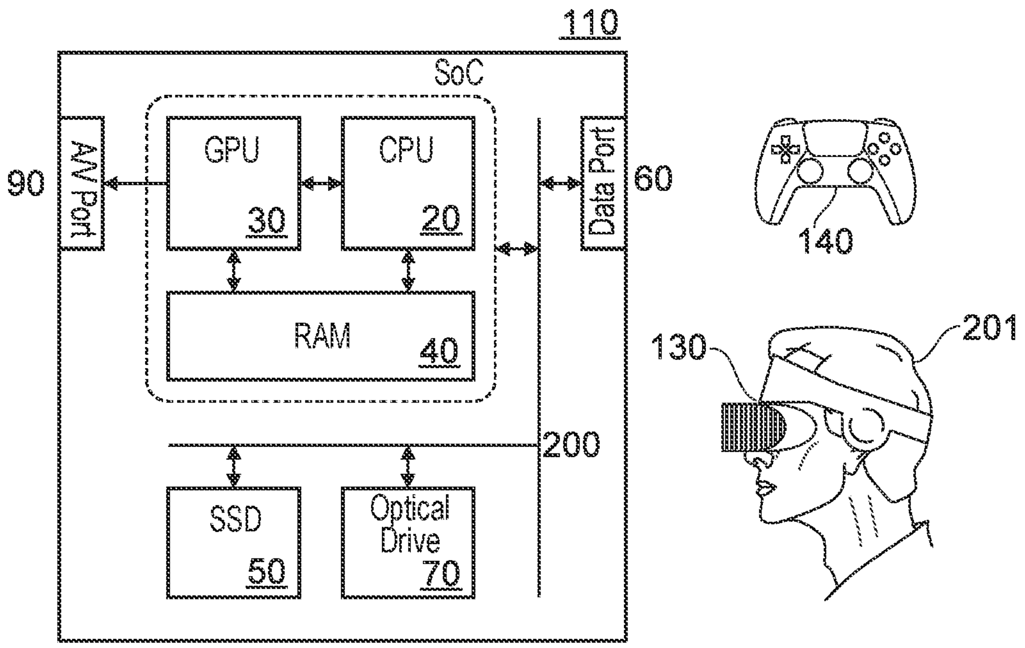
FIGS. 2A and 2B schematically show example components associated with the entertainment system.

FIG. 2A shows an example of the games console 110. An example is the Sony® PlayStation 5® (PS5). The games console 110 is an example of a data processing apparatus.

The games console 110 comprises a central processing unit or CPU 20. This may be a single or multi core processor, for example comprising eight cores as in the PS5. The games console also comprises a graphical processing unit or GPU 30. The GPU can be physically separate to the CPU, or integrated with the CPU as a system on a chip (SoC) as in the PS5.

The games console also comprises random access memory, RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive (SSD), or an internal SSD as in the PS5.

The games console may transmit or receive data via one or more data ports 60, such as a universal serial bus (USB) port, Ethernet® port, WiFi® port, Bluetooth® port or similar, as appropriate. It may also optionally receive data via an optical drive 70.

Interaction with the games console is typically provided using one or more instances of the controller 140, such as the DualSense® handheld controller in the case of the PS5. In an example, communication between each controller 140 and the games console 110 occurs via the data port(s) 60.

Audio/visual (A/V) outputs from the games console are typically provided through one or more A/V ports 90, or through one or more of the wired or wireless data ports 60. The A/V port(s) 90 may also receive audio/visual signals output by the integrated camera and microphone 120, for example. The microphone is optional and/or may be separate to the camera. Thus, the integrated camera and microphone 120 may instead be a camera only. The camera may capture still and/or video images.

Where components are not integrated, they may be connected as appropriate either by a dedicated data link or via a bus 200.

As explained, examples of a device for displaying images output by the game console 110 are the display device 100 and the HMD 130. The HMD is worn by a user 201. In an example, communication between the display device 100 and the games console 110 occurs via the A/V port(s) 90 and communication between the HMD 130 and the games console 110 occurs via the data port(s) 60.

The controller 140 is an example of a peripheral device for allowing the games console 110 to receive input from and/or provide output to the user. Examples of other peripheral devices include wearable devices (such as smartwatches, fitness trackers and the like), microphones (for receiving speech input from the user) and headphones (for outputting audible sounds to the user).

Figure 2B:
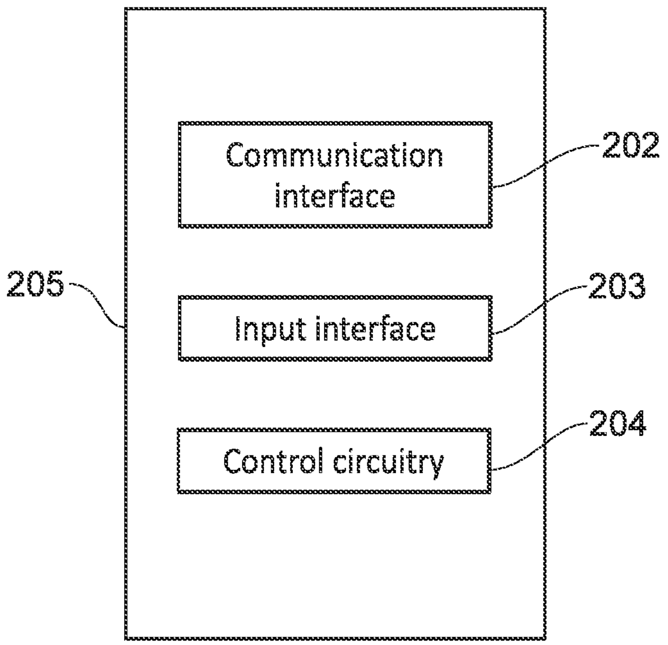

FIG. 2B shows some example components of a peripheral device 205 for receiving input from a user. The peripheral device comprises a communication interface 202 for transmitting wireless signals to and/or receiving wireless signals from the games console 110 (e.g. via data port(s) 60) and an input interface 203 for receiving input from the user. The communication interface 202 and input interface 203 are controlled by control circuitry 204.

In an example, if the peripheral device 205 is a controller (like controller 140), the input interface 203 comprises buttons, joysticks and/or triggers or the like operable by the user. In another example, if the peripheral device 205 is a microphone, the input interface 203 comprises a transducer for detecting speech uttered by a user as an input. In another example, if the peripheral device 205 is a fitness tracker, the input interface 203 comprises a photoplethysmogram (PPG) sensor for detecting a heart rate of the user as an input. The input interface 203 may take any other suitable form depending on the type of input the peripheral device is configured to detect.

Figure 3:
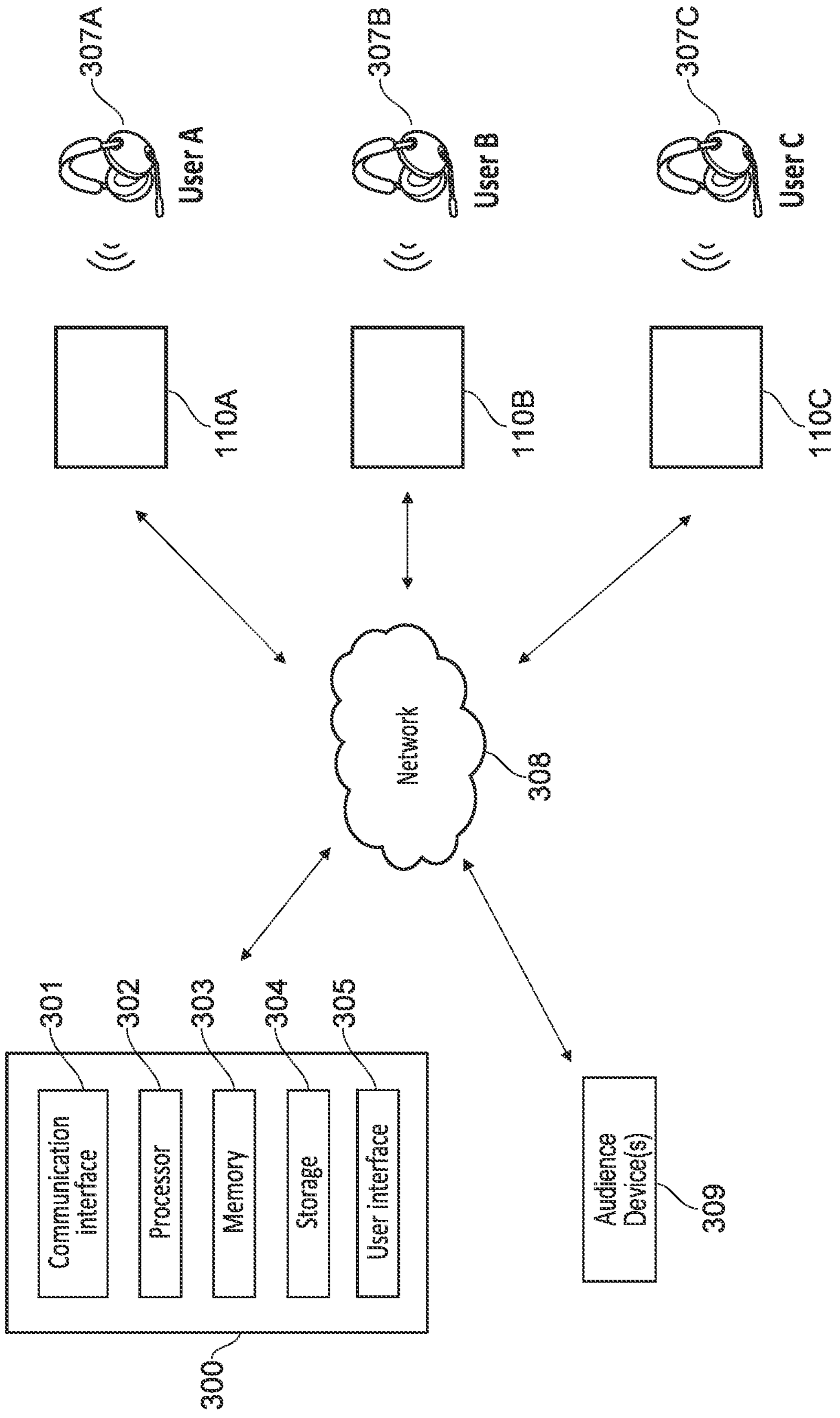
FIG. 3 schematically shows data processing apparatuses connected over a network.

FIG. 3 shows an example system for live streaming a multiplayer game played by a plurality of users (users A, B and C). For example, the multiplayer game may be an open world game where the users control characters which complete tasks as a team in a virtual world. In another example, the multiplayer game may be a first person shooter where the users control characters which compete against each other. Here, live streaming means that the video and/or audio output of a video game as experienced by one of more of the users is transmitted in real time (or near real time, optionally with a delay such as a one- or two-minute delay) to one or more non-playing users. For example, the video and/or audio is transmitted over the network 308 using a suitable video and/or audio transmission technique (e.g. the Real-time Transport Protocol (RTP)). The one or more non-playing users form a virtual audience.

Online multiplayer gameplay and live streaming (or, simply, streaming) is implemented via a server 300, which is another example of a data processing apparatus. The server comprises a communication interface 301 for sending electronic information to and/or receiving electronic information from one or more other apparatuses, a processor 302 for executing electronic instructions, a memory 303 for storing the electronic instructions to be executed and electronic input and output information associated with the electronic instructions, a storage medium 304 (e.g. a hard disk drive or solid state drive) for long term storage of information and a user interface 305 (e.g. a touch screen, a non-touch screen, buttons, a keyboard and/or a mouse) for receiving commands from and/or outputting information to a user. Each of the communication interface 301, processor 302, memory 303, storage medium 304 and user interface 305 are implemented using appropriate circuitry, for example. The processor 302 controls the operation of each of the communication interface 301, memory 303, storage medium 304 and user interface 305. The online multiplayer gameplay and live streaming may be implemented by separate respective servers (each having the configuration of the server 300, for example). In this example, for case of explanation, only a single server is used.

The server 300 is connected over a network 308 (e.g. the internet) to a plurality of further data processing apparatuses associated with different respective users playing a multiplayer game together that is to be live streamed to an audience. In this example, each further data processing apparatus is a games console having the features of games console 110. Each games console 110A, 110B and 110C is, in turn, connected to a respective gaming headset 307A, 307B and 307C. This allows the users A, B and C to communicate with each other during the game using their voices. The server 300 connects to the network 300 via the communication interface 301 and each games console connects to the network 300 via its respective data port(s) 60, for example.

In order for users A, B and C to partake in the multiplayer game together (even though they may be in separate geographical locations), separate copies of the same video game application are executed (e.g. by CPU 20 and/or GPU 30) on each games console 110A, 110B and 110C. The video game application causes the games console on which it is run to exchange data with the server 300 over the network 308. This allows video game data generated by games console 110A (e.g. the real time position of a video game character controlled by User A) to be shared with games consoles 110B and 110C. Similarly, it allows video game data generated by games console 110B to be shared with games consoles 110A and 110C and video game data generated by games console 110C to be shared with games consoles 110A and 110B. This allows users A, B and C to interact with each other in the multiplayer game even though they may be in different physical locations. Only three users are shown here for simplicity. In reality, a larger number of users may be connected (e.g. through respective games consoles associated with each other) to the server 300 via the network 308 in order to play and interact with each in the multiplayer online game. The server 300 may perform various functions such as correctly routing video game data between the games consoles.

As well as video game data being exchanged between the games consoles 110A, 110B and 110C via the server 300, the users A, B and C may also communicate with each other (as previously described) via the games consoles and server using headsets 307A, 307B and 307C. In this example, users A, B and C each have a headset 307A, 307B and 307C connected (e.g. via a Bluetooth® or Wi-Fi® connection) to their respective games consoles 110A, 110B and 110C (e.g. via data port(s) 60). Each headset comprises a microphone (an example of a peripheral device 205 with a transducer as the input interface 203) to allow a user to speak to another user and headphones to allow a user to hear speech from other users. Electronic signals indicative of the speech of a user detected by the microphone of that user's headset is transmitted to the headphones (comprising one or more loudspeakers) of the headset of another user via the network 308 and server 308. For example, the server 308 may implement a Voice over Internet Protocol (VOIP) to allow users to communicate with each other over the network 308 using their voices and respective headsets. The VoIP channel is private so only the users A, B and C are able to obtain voice data transmitted over the VOIP channel, for example.

Each audience member is able to view the live stream of the multiplayer game being played via a suitable audience device 309. The device 309 is connectable to the network 308 and may be, for example, another games console 110, a personal computer, a laptop, smart TV, a tablet computer or smartphone. The device 309 is configured to playback audio and video streamed over the network 308.

In an example, the live stream is data indicative of the video and/or audio output experienced by one or more of the users A, B and C as they play the multiplayer game. This allows non-playing audience members to experience what the one or more users are experiencing as they play the game. When each user A, B and C has consented to their video and/or audio output being streamed to non-playing audience members, each games console 110A, 110B and 110C transmits data indicative of its video and/or audio output to the server 300 over the network 308 (e.g. using a suitable video and/or audio codec). In the given examples, both video and audio are provided as the live stream. The transmitted data may be representative of the HDMI (High Definition Multimedia Interface) output of each games console as the game is played (the HDMI data stream being encoded or further encoded if necessary depending on available network bandwidth). The transmitted data is then routed by the server 300 to one or more audience devices 309 for playback. In an example, each audience member must be registered with the server (e.g. by having an account with a unique username and password) to access the live stream via their respective audience device 309.

The server 300 may select which transmitted audio and/or video data stream is to be provided to the audience device(s) 309. In one example, the audio and/or video data stream of only one of the users A, B and C is provided to the audience device(s) 309 at any given time. In another example, the audio and/or video data stream of two or more of the users A, B and C is provided to the audience device(s) 309 (e.g. with the video data stream in a split-screen format and with the audio data stream of only one of the users being output). The selected audio and video data stream may be determined automatically by the server 300 (e.g. so the server periodically switches between the data streams provided by each user or by the server selecting, using a suitable image and/or audio analysis algorithm, the most engaging data stream(s) at any given time). In this case, all audience devices 309 may receive the same data stream. Alternatively, each audience device 309 may be configured to enable its non-playing user to select one or more of the data streams to be live streamed. In any case, when the server 300 implements a live stream, each games console 110A, 110B and 110C transmits a data stream representing its current video and/or audio output to the server 300. The server 300 then transmits at least one of the received data streams to at least one of the audience devices 309. This occurs in real time (with an optional delay, as mentioned above) to enable remote, non-playing users to experience the game "live" from the perspective of one or more of the playing users A, B and C.

In an example, as well as the audio output generated by the game itself being included in the data stream transmitted by each games console 110A, 110B and 110C to the server 300 and shared with the audience device(s) 309, audience experience can be enhanced if audio data representing the voice communication between users A, B and C as they play the game and speak into their headsets 307A, 307B and 307C is also included in the shared data stream. This allows audience members to empathise with the players and provides an improved experience. In an example, the users A, B and C communicate using a VOIP channel (e.g. implemented by server 300, although a similarly-configured different server may be used) and each games console 110A, 110B and 110C adds the voice audio data transmitted over this channel to the game audio data generated by the game itself (e.g. the audio data of the output HDMI data stream generated by the game) to generate combined audio data (e.g. using any suitable known technique for combining audio from two digital channels into a single digital channel). The combined audio data is then what is streamed to the server 300 and shared with the audience device(s) 309. The voice communication between the users A, B and C is therefore made public.

Figure 4:
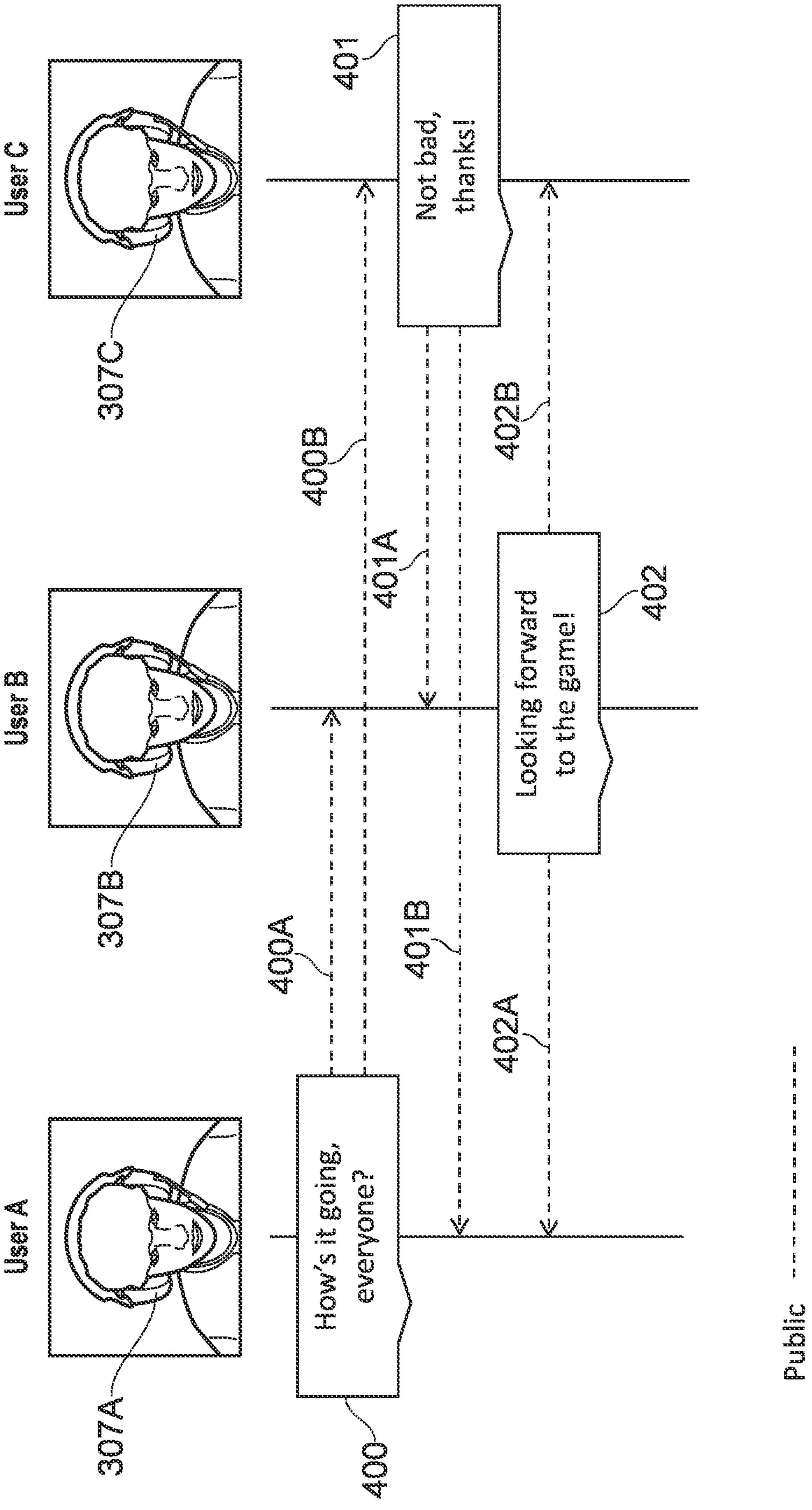
FIG. 4 schematically shows a first example transmission of voice audio data between users.

Public voice communication between the users A, B and C is exemplified in FIG. 4.

Here, user A utters speech 400 ("How's it going, everyone?") and it is picked up by the microphone of headset 307A. Data representing the uttered speech is then transmitted, via VoIP transmissions 400A and 400B, for reproduction by the headphones of headsets 307B and 307C, respectively.

In response, user C then utters speech 401 ("Not bad, thanks!") and it is picked up by the microphone of headset 307C. Data representing the uttered speech is then transmitted, via VOIP transmissions 401A and 401B, for reproduction by the headphones of headsets 307B and 307A, respectively.

User B then utters speech 402 ("Looking forward to the game!") and it is picked up by the microphone of headset 307B. Data representing the uttered speech is then transmitted, via VoIP transmissions 402A and 402B, for reproduction by the headphones of headsets 307A and 307C, respectively.

In this example, none of the users A, B or C have said anything which, for example, identifies them personally or indicates any gaming information which they want to keep secret from competitors. The users are therefore happy for the voice conversation to remain public.

Figure 5:
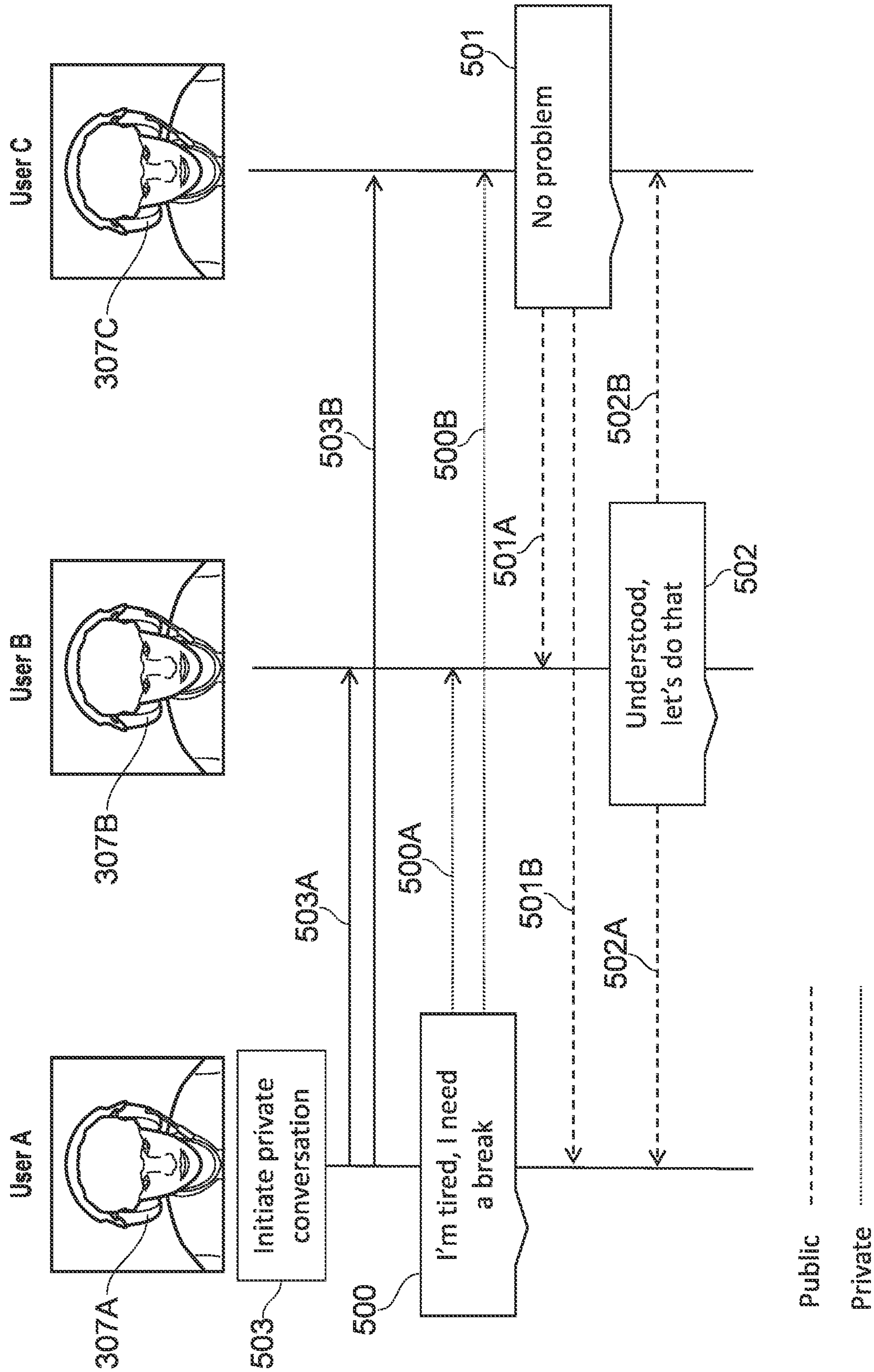
FIG. 5 schematically shows a second example transmission of voice audio data between users.

On the other hand, in some circumstances, one or more of the users may wish for something they say not to be made public. This scenario is exemplified in FIG. 5

Here, user A wishes to inform users B and C that they are tired and require a break. User A does not wish for this information to be public, since user A's tiredness may indicate to a competitor team (when users A, B and C are playing as a team in the game) that user A's gaming ability may be temporarily compromised. For example, tiredness may slow reaction times and negatively affect decision-making ability. The competitor team may then be able to take advantage of this.

To address this, prior to user A informing users B and C of their tiredness, they perform a step 503 to initiate a private conversation mode. The private conversation mode may be initiated (enabled) by the user undertaking a predetermined control input. For example, as the control input, the user may press a predetermined button (not shown) on controller 140 or on their headset 307 or may provide a predetermined voice command or the like to their games console 110A. In response to the initiation of the private conversation mode by user A, user A's games console 110A transmits a notification 503A and 503B to user B's games console 110B and user C's games console 110C, respectively, to inform them that private conversation mode has been initiated by user A.

In the private conversation mode, the voice audio data representing the uttered speech 500 ("I'm tired, I need a break") of user A is transmitted, via VOIP transmissions 500A and 500B, to users B and C. However, this audio data is not added to the game audio data by any of the games consoles 110A, 110B or 110C to generate combined audio data to be transmitted to the server 300 and shared with the audience device(s) 309. Rather, in the private conversation mode, only the game audio data generated by each games consoles is transmitted to the server to be shared with the audience device(s). Thus, only users B and C learn of user A being tired and user A's uttered speech 500 remains private between users A, B and C. Audience members are still, however, able to receive the game audio data, meaning a high quality live streaming experience for audience members is maintained.

In this example, once user A has completed uttering speech 500, private conversation mode is ended (disabled). This may be done, for example, by user A undertaking a further predetermined control input. For example, the user may press a predetermined button (not shown) on controller 140 or on their headset 307A may provide a predetermined voice command or the like to their games console 110A. In another example, the user may press and hold a predetermined button (e.g. on the controller 140 or headset 307A) to initiate the private conversation mode and release the predetermined button to end the private conversation mode. The games console 110A may also determine automatically to end the private conversation mode when it determines that uttered speech 500 is complete (e.g. because speech from user A is no longer detected, e.g. for a period of 1 second). When the private conversation mode is ended, notifications (not shown in FIG. 5) are transmitted to each of games consoles 110B and 110C to inform them that private conversation mode has ended. Each games console therefore once again adds voice audio data to the game audio data to generate combined audio data to be transmitted to the server 300 and shared with audience device(s) 309 during the live stream.

Thus, when, in response to uttered speech 500, user C then utters speech 501 ("No problem"), the voice audio data representing the uttered speech 501 transmitted via VOIP transmissions 501A and 501B to users A and B is also transmitted by each games console 110A, 110B and 110C with its generated game audio data to the server 300 to be streamed to audience device(s) 309. Similarly, when user B then utters speech 502 ("Understood, let's do that"), the voice audio data representing the uttered speech 502 transmitted via VOIP transmissions 502A and 502B to users A and C is also transmitted by each games console 110A, 110B and 110C with its generated game audio data to the server 300 to be streamed to audience device(s) 309. Unlike speech 500 of user A, speech 501 of user C and speech 502 of user B therefore remain public.

In this example, unlike speech 500 of user A, neither speech 501 of user C nor speech 502 of user B contain any information which might indicate what user A has said privately. On the other hand, in some circumstances, it may be the case that user B or user C say something in reply to user A which, for example, may be used to identify user A or what user A said. In this case, it may be desirable for the speech of users B and C to remain private even if was user A (rather than user B or C) who initiated the private conversation mode.

Figure 6:
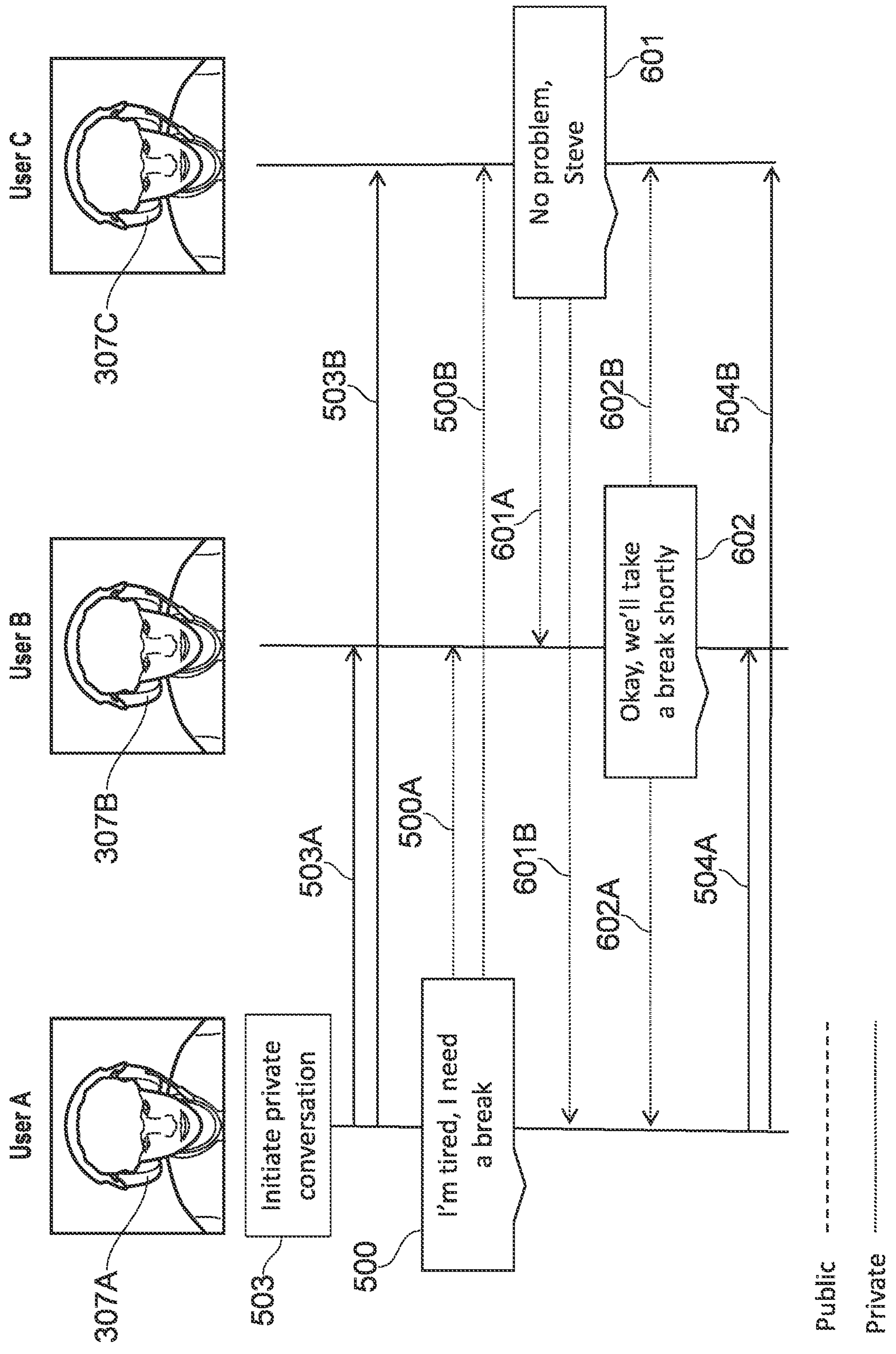
FIG. 6 schematically shows a third example transmission of voice audio data between users.

This scenario is exemplified in FIG. 6 in which, in response to user A's uttered speech 500, user C responds with uttered speech 601 ("No problem, Steve") and user B response with uttered speech 602 ("Okay, we'll take a break shortly"). Uttered speech 601 therefore contains the real name of user A ("Steve") and uttered speech 602 contains an indicator (that is, the requirement of a "break") that one or more of the players may be tired. Both are examples of information which the players may wish to keep private, even though it was only user A who initiated the private conversation mode. Voice audio data representing uttered speech 601 is therefore transmitted to users A and B via VOIP transmissions 601A and 601B but not shared publicly (so it is not added to the game audio data which is to be streamed to the audience). Similarly, voice audio data representing uttered speech 602 is transmitted to users A and B via VOIP transmissions 602A and 602B but not shared publicly (so it is not added to the game audio data which is to be streamed to the audience). Uttered speech 601 and 602 therefore remains private.

In an example, the switch between public and private voice communication is controlled by the CPU 20 of the games console of the user who initiates the private conversation mode (thus, games console 110A in the example of FIG. 6). Thus, in response to user A initiating the private conversation mode, games console 110A controls the transmission of notifications (that is, electronic notification messages) 503A and 503B indicating initiating of the private conversation mode to games consoles 110B and 110C (of users B and C, respectively). Furthermore, in response to the private conversation mode ending (either manually by user A or automatically), games console 110A controls the transmission of further notifications (that is, electronic notification messages) 504A and 504B indicating the end of the private conversation mode to games consoles 110B and 110C. Between the transmission of "start" notifications 503A and 503B and the transmission of "end" notifications 504A and 504B, none of the games consoles output voice audio data on the VoIP channel for streaming to audience device(s) 309. This ensures the conversation between the users A, B and C over the VOIP channel remains private during the private conversation mode.

There are a number of ways to help ensure that responses (e.g. uttered speech 601 and 602 from users C and B, respectively) to speech uttered by one user (e.g. uttered speech 500 from user A) in a private conversation mode initiated by that user remain private.

This may be controlled manually by the user who initiates the private conversation mode. Thus, for example, once user A initiates the private conversation mode, "start" notifications 503A and 503B are transmitted to users B and C and user A does not end the private conversation mode and transmit "end" notifications 504A and 504B until the speech 500, 601 and 602 has been uttered and the conversation moves on to a topic the users do not wish to keep private. However, this requires the user A to remember to manually end the private conversation mode (e.g. using by pressing a predetermined button on their controller 140 or headset 307 or providing a suitable voice command to games console 110A). Furthermore, if user A forgets to do this, the audience may be unnecessarily deprived of voice communication between the players when privacy is no longer necessary, thereby detracting from the audience experience. A solution which is both more convenient and which reduces the risk of audience members being accidently deprived of hearing a non-private conversation between users A, B and C as they play the game.

In an example, the games console 110A sets a timer once user A initiates the private conversation mode and transmits "start" notifications 503A and 503B. The timer is set to correspond to an approximate time between replies between users when discussing a particular topic. For example, the timer may be set to a predetermined threshold of 5, 10 or 15 seconds. The timer then restarts each time one of the users A, B and C utters speech before the timer expires.

Thus, for example, if the timer is 5 seconds, the 5 second timer begins when user A initiates the private conversation mode at step 503. If the games console 110A detects the uttered speech 500 from user A within 5 seconds of the start of the timer, the uttered speech 500 remains private and the games console 110A restarts the timer. If the games console 110A then detects the uttered speech 601 from user C within 5 seconds of the start of the newly restarted timer, the uttered speech 601 also remains private and the games console 110A restarts the timer again. If the games console 110A then further detects the uttered speech 602 from user C within 5 seconds of the start of the further newly restarted timer, the uttered speech 602 also remains private and the games console 110A restarts the timer. This continues until the timer expires with no further speech detected. Once the timer expires, the games console 110A automatically transmits the "end" notifications 504A and 504B and all speech becomes public again.

This provides a processor-efficient way of determining whether or not to end the private conversation mode, since all that is required is for one games console to start and restart a timer in response to detected speech.

Figure 7:
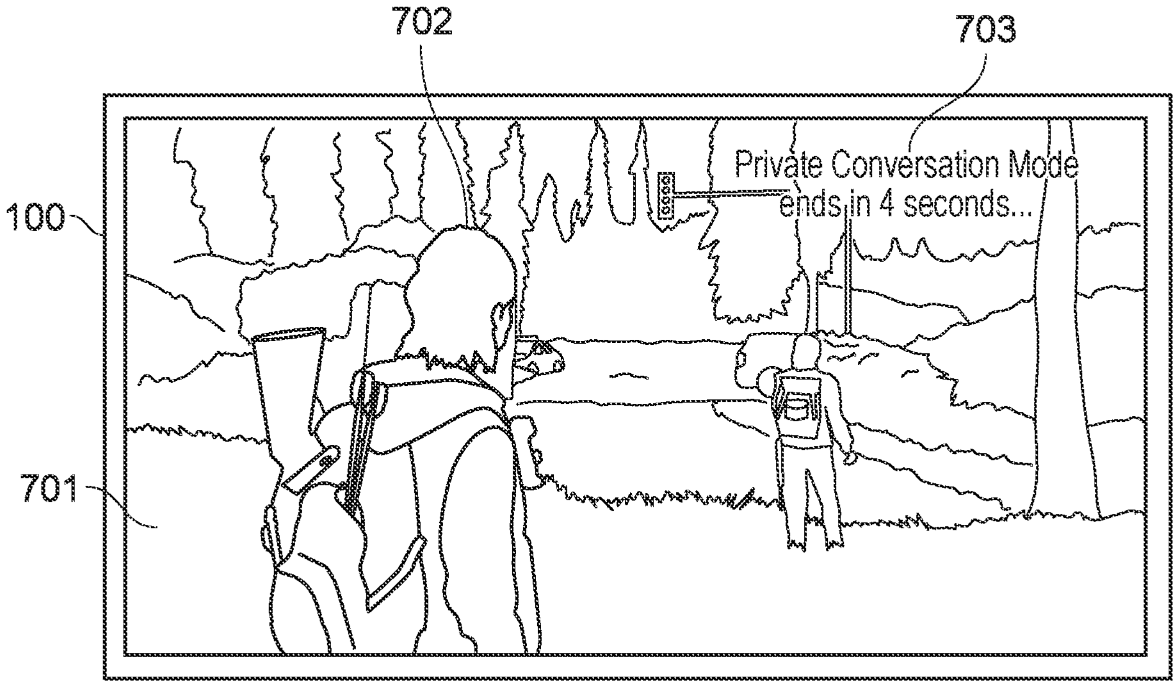
FIG. 7 schematically shows an example live alert displayable to a user.

FIG. 7 shows a live alert 703 that may be displayed to at least user A (and, optionally, users B and C) in this example. Here, video output 701 of the game (in which user A is controlling an in-game character 702) is displayed on the display device 100 of user A and, once user A initiates the private conversation mode, live alert 703 indicating the current time on the timer is overlaid on the game video output. Thus, the current alert "Private Conversation Mode ends in 4 seconds . . . " will, after a second, turn to "Private Conversation Mode ends in 3 seconds . . . " followed, after a further second, by "Private Conversation Mode ends in 3 seconds . . . " and so on until it expires (at which point the live alert 703 disappears from view). If speech is uttered by one of the users A, B and C before the timer expires, the timer is restarted and the live alert 703 indicates this accordingly (e.g. by being reset to display "Private Conversation Mode ends in 5 seconds . . . ")).

In the case that the live alert 703 is also displayed to users B and C, the games console 110A may transmit a "restart" alert (not shown) to games consoles 110B and 110C each time it detects speech on the VOIP channel before the timer has expired. In response to the "restart" alert, each games console 110B and 110C resets its respective output live alert 703 to indicate the restart of the timer to users B and C (e.g. by resetting the live alert 703 to read "Private Conversation Mode ends in 5 seconds . . . " and counting down the seconds, as previously described). This allows each of users A, B and C to easily know whether or not their conversation is private. The live alert 703 display on each console may also be output as part of the video data transmitted to the server 300 for streaming to the audience device(s), thereby allowing audience members to know how long they might expect to wait until the private conversation ends and they are able to hear the conversation again. This helps improve the quality of the live stream experience for the audience members.

In an example, a suitable machine learning method may be used to detect whether speech from users B or C detected subsequently to the detection of speech from user A in private conversation mode should be kept private or can be shared with the audience based on content in the speech from user A and users B or C.

In one example, this may involve keyword detection in the responses from users B and C. For instance, if speech uttered by user B or C includes a person's name or includes a keyword (e.g. a word other than common determiners or prepositions such as "the", "in", etc.) also included in the initial speech uttered by user A in private conversation mode, it may be determined that this is a response to the speech uttered by user A, and therefore the speech uttered by user B or C also remains private.

This would be the case, for example, in FIG. 6, where uttered speech 601 includes the name "Steve" and where uttered speech 601 includes the word "break" which was also included in the uttered speech 500 from user A. In this case, the games console 110A will not transmit the "end" notifications 504A and 504B and thus uttered speech 601 and 602 remains private. On the other hand, for example, in FIG. 5, neither uttered speech 501 nor uttered speech 502 include a name or keyword included in the uttered speech 500, and thus uttered speech 501 and 502 does not need remain private. In this case, the games console 110A transmits the "end" notifications 504A and 504B.

In an example, the voice audio data of the VOIP channel over which the uttered speech 500, 501 and 502 is transmitted is buffered (e.g. in RAM 40 of each of games consoles 110A, 110B and 110C) for a period of time corresponding to the length of time of an instance of uttered speech while the determination of whether or not the instance of uttered speech should remain private is made. If it is determined that the uttered speech should remain private, the buffer is cleared and the VoIP channel remains in private conversation mode. On the other hand, if it is determined that the uttered speech does not need to remain private (and can therefore be included in the live stream to the audience), once games console 110A has transmitted the "end" notifications 504A and 504B, the voice audio data of the VOIP channel is streamed and includes the buffered voice audio data. This allows the audience to begin listening to the VoIP conversation as soon as it is determined that it is no longer private, thereby reducing the chance of parts of the conversation which do not need to be private being missed by the audience.

Any delay caused by the buffering of the voice data may be compensated for when streaming of the voice audio data to the audience resumes by, for example, temporarily speeding up playback of the voice audio data until the buffer has been cleared. For example, the processor 20 of each games console may transmit, with the voice audio data to be streamed, an indicator (e.g. a flag) indicating to the server 300 that the voice audio data needs to be temporarily played back at a speed of (1+Y) times (where Y is a positive number to speed up playback of the voice audio data, e.g. Y=0.25 or 5) for S=T/Y seconds (where T is the length buffer time in seconds).

Thus, for example, if the voice audio data of the VOIP channel is buffered for T=2 seconds while it is determined that uttered speech represented by the buffered voice audio data no longer needs to be private and if the increased playback speed is 1.25 times (that is, 1.25×, so Y=0.25) then, once streaming of the voice audio data from each console restarts (in response to the private conversation mode being ended up games console 110A and games consoles 110B and 110C receiving the "end" notifications 504A and 504B), each console indicates in the voice audio data it transmits to the server 300 (for transmission to the audience device(s) 309) that the voice audio data should be played back at 1.25 times speed for S=2/0.25=8 seconds. After 8 seconds, the voice audio data is then played back at regular (that is, 1×) speed. This allows the conversation heard by the audience to catch up with that real time conversation between the users A, B and C.

In an example, the server decodes the received voice audio data, applies the increase to the playback speed and re-encodes the voice audio data (with the increased playback speed) for streaming to the audience device(s) 309, thereby reducing the encode/decoding processing required at each games console and/or audience device.

The information Y and T may be transmitted from each games console to the server in header information of data packets of the voice audio data, for example. Alternatively, the server 300 may determine Y and T based on an amount of time it has not received voice audio data packets from any of the games consoles 110A, 110B and 110C. For example, if the server 300 temporarily stops receiving voice audio data packets from any of the games consoles for 2 seconds, it will determine that T=2. Y may be fixed in advance (e.g. at 0.25). Alternatively, S may be fixed (e.g. at 8 seconds) to provide a uniform catch-up time for different buffering time periods. This allows audience members to know that, once the known S seconds has elapsed, they are once again hearing the VoIP between users A, B and C in real time (or as near to real time as possible, taking into account any unavoidable time lag over the network 308). In this case, the longer T is, the greater Y will be to compensate for this. Thus, for example, if S is fixed at 8 seconds and T=2 seconds then, in this instance, Y is set at T/S=0.25 (and thus playback is temporarily sped up to 1.25× for 8 seconds). On the other hand, if T=4 seconds then, in this instance, Y is set at T/S=0.5 (and thus playback is temporarily sped up to 1.5× for 8 seconds).

Figure 8:
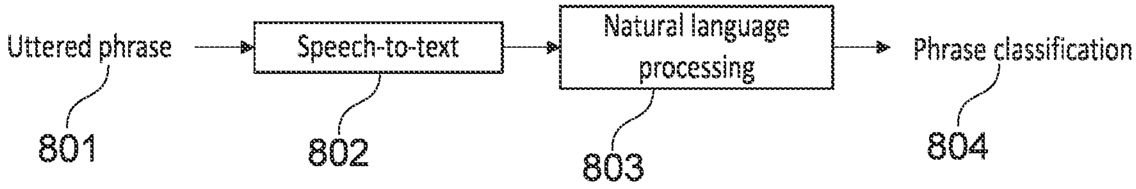
FIG. 8 schematically shows an example speech processing technique.

FIG. 8 shows a general example of how machine learning can be used to determine whether or not detected speech (e.g. speech 501, 502, 601 or 602) uttered subsequent to speech (e.g. speech 500) initially uttered following initiation of the private conversation mode is to remain private.

In an example, these are steps carried out by the CPU 20 of the games console 110A at which the private conversation mode is initiated. In another example, the steps are carried out by the processor 302 of the server 300 (or a similarly-configured different server) based on audio data indicative of uttered speech transmitted from the games console 110A to the server 300. Information indicating the output of the steps (e.g. a classification of an instance of uttered speech—see below) is then transmitted back to the games console 110A.

In FIG. 8, audio data indicative of each instance of uttered speech 801 detected following initiation of the private conversation made is first passed to a speech-to-text program 802 (such as a Hidden Markov Model (HMM) algorithm). This converts the uttered speech into a textual format. The uttered speech in the textual format is then passed to a natural language processing program 803.

The natural language processing program 803 classifies each instance of speech uttered after initially-uttered speech (e.g. speech 501, 502, 601 or 602 after initially-uttered speech 500) to determine whether it is private or non-private. In one example, the program 803 determines keywords such as names (e.g. "Steve" in speech 601) or repeats of keywords in the initially-uttered speech (e.g. "break" in speech 602), as previously described.

Alternatively, or in addition, the program uses a suitable machine learning algorithm to classify whether each instance of speech uttered after the initially-uttered speech is likely to be a response to the initially uttered speech (in which case the instance of speech should remain private and the private conversation mode is maintained) or is likely to indicate the start of an unrelated conversation (in which case the instance of speech does not need to remain private and the private conversation mode is ended). In this case, for example, the natural language processing program 803 is a machine learning model (such as a bag-of-words model) which has previously been trained using a training set of phrases and their respective labelled classifications. A training set may be generated by capturing, for instance, a number (e.g. 5,000) of phrases uttered by various users during an online gaming session and manually labelling these as either a "response" (indicating private conversation mode should be maintained) or "non-response" (indicating private conversation mode can be ended). Using a suitably-trained machine learning model in this way allows nuances of language in instances of uttered speech which indicate it is a response to previously uttered speech (rather than the initiation of a new and unrelated conversation) to be detected.

In an example, the classification of a given instance of uttered speech may be weighted according to the amount of time elapsed between detection of the instance of uttered speech and detection of the instance of uttered speech immediately preceding it. Thus, for example, it may be determined that the longer the time elapsed between two instances of speech, the less likely the later instance is a response to the earlier instance (and thus the less likely the later instance needs to remain private).

This may be implemented, for example, by initially assigning a classification of "1" to uttered speech classified as a "response" (or "private") and a classification of "0" to uttered speech classified as "non-response" (or "non-private"). If the uttered speech is initially classified by the natural language processing program 803 as "0", then it is determined the uttered speech is a "non-response" and the private conversation mode is ended. On the other hand, if the uttered speech is initially classified by the natural language processing program 803 as "1" then, depending on the amount of time elapsed between the detection of this classified speech instance and the immediately preceding speech instance, the value "1" is reduced accordingly.

For example, the value "1" may be reduced according to a predetermined linear, polynomial or exponential relationship with time (e.g. starting from the initial value "1" at time t=0 and reducing to "0" as t increases). In an example, if the initial value "1" is reduced to less than "0.5" according to the amount of time elapsed, the classification "response" is reclassified as "non-response". The private conversation mode is therefore ended due to the time elapsed between speech between the users, even though the latest uttered speech was initially classified as a response. On the other hand, if the initial value "1" is reduced to a value which is still greater than or equal to "0.5", the classification "response" is kept. The private conversation mode is therefore maintained. This provides enables multiple factors (e.g. the words used and the time between instances of speech) to be used to determine whether or not an instance of speech should be kept private or not, and thus allows this to be determined more accurately. In an example, the threshold value "0.5" may be adjusted by one or more of the users (e.g. user A) using a suitable settings menu or the like (not shown) to take into account individual user preferences (e.g. the speed with which a particular set of users A, B and C typically reply to each other during an online game).

The final speech classification 804 is output by the natural language processing program 803 (and, if determined by a server rather than games console 110A itself, information indicative of this classification is transmitted to the games console 110A). If the classification is "response", then the games console 110A maintains the private conversation mode. On the other hand, if the classification is "non-response", the games console 110A ends the private conversation mode (and transmits "end" notifications 504A and 504B to games consoles 110A and 110B). The ending or maintenance of the private conversation mode is therefore controlled automatically, providing improved convenience for users A, B and C and reducing the risk of audience members being accidently denied access to non-private conversation between the users A, B and C. Audience experience of the live stream is therefore improved with improved convenience to users A, B and C. At the same time, when necessary, the privacy of the conversation between users is maintained.

Figure 9:
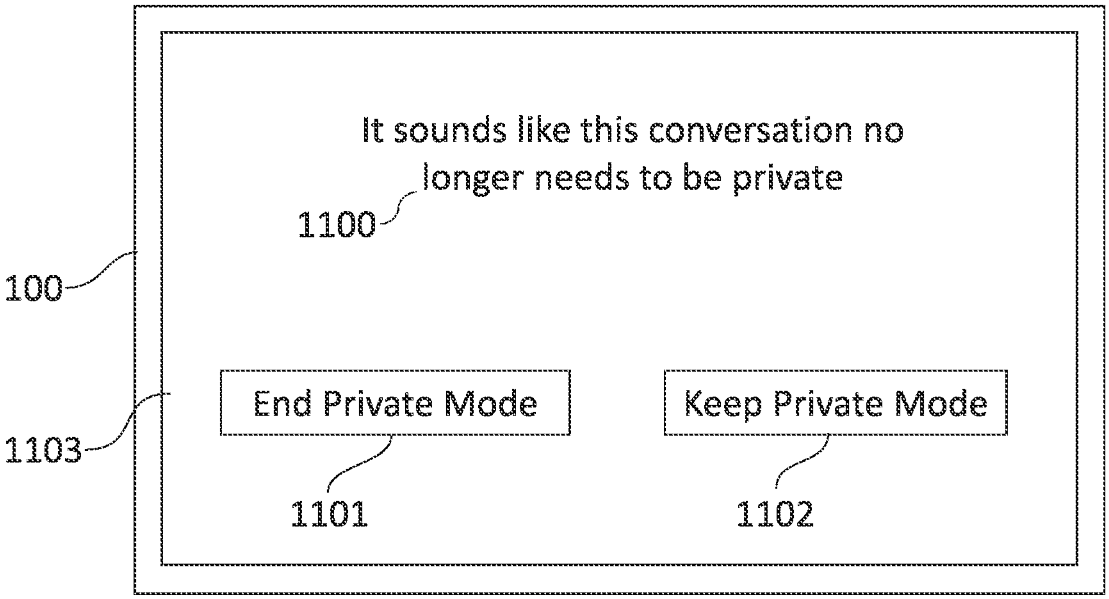
FIG. 9 schematically shows an example confirmation screen displayable to a user.

To further improve the security of private information, if the latest uttered instance of speech is classified as a "non-response", thereby indicating that the private conversation mode can be ended, then permission from at least one of the users (e.g. user A, who originally initiated the private conversation mode) is requested before the private conversation mode is ended. This is exemplified in FIG. 9, in which games console 110A presents confirmation screen 1103 to user A on display device 100. The screen 1103 includes information 1100 indicating that it has been determined that the conversation no longer needs to remain provide and provides virtual buttons 1101 ("End Private Mode") and 1102 ("Keep Private Mode"). Selection of the virtual button 1101 by the user causes the private conversation mode to be ended. Selection of the virtual button 1102, on the other hand, causes the private conversation mode to be retained (and the processing of FIG. 8 is restarted based on subsequently detected speech).

In an example, to allow the user to continue gaming while the information 1100 and virtual buttons 1101 and 1102 are displayed, the screen 1103 may appear in only a portion (e.g. top corner) of the display of the display device 100 and the rest of the display may be used to continue to display the video output of the game.

A countdown timer (not shown) may also be provided on the screen which counts down from a predetermined number of seconds (e.g. 10 seconds). If no selection of either of the virtual buttons 1101 or 1102 is made before the countdown timer expires, then a default selection (e.g. to maintain the private conversation mode, thereby helping ensure user privacy) is made.

To help facilitate cooperation and control between users A, B and C regarding the user of the private conversation mode, it may be that all users (or, for example, a predetermined number or proportion of the users) must agree to start or end the private conversation mode. This is exemplified in FIGS. 10A and 10B.

Figure 10A:
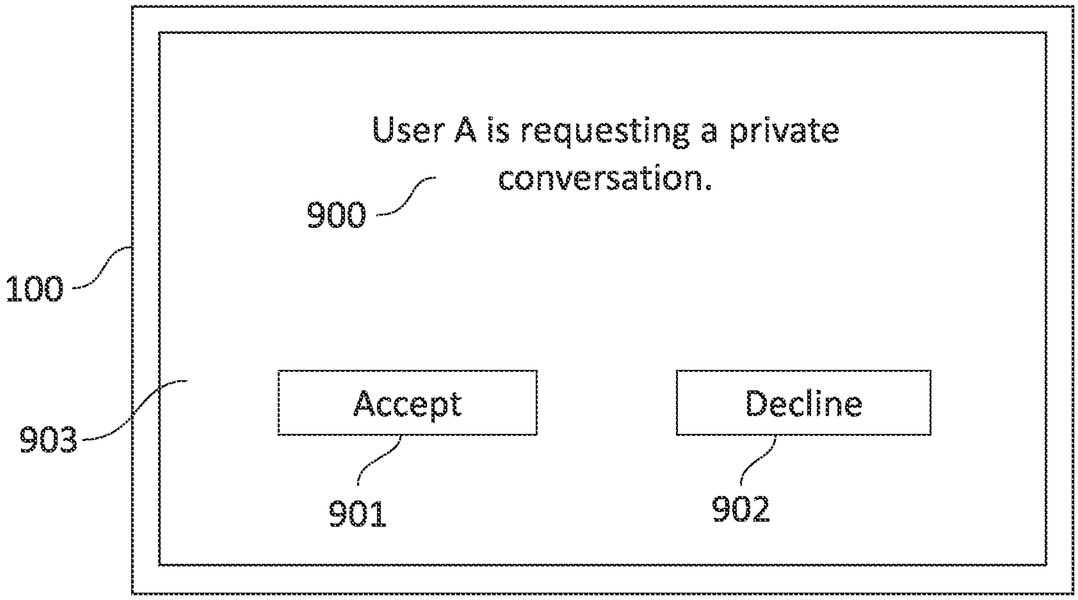
FIGS. 10A and 10B schematically show example request screens displayable to a user.

FIG. 10A shows an example of a request screen 903 displayed by games consoles 110B and 110C to users B and C when user A attempts to initiate the private conversation mode. For example, games consoles 110B and 110C may display the request screen 903 in response to receiving the "start" notifications 503A and 503B, respectively. The screen 903 includes information 900 indicating that user A wishes to initiate the private conversation mode and provides virtual buttons 901 ("Accept") and 902 ("Decline").

Selection of the virtual button 901 by each (or by at least one of) users B and C causes the private conversation mode to be initiated. This is implemented by, for example, at least one of the games consoles 110B and 110C transmitting a positive response (not shown) to "start" notification 503A or 503B which causes the games console 110A to transmit "confirmation" notifications (not shown) to each games console 110B and 110C confirming the start of the private conversation mode.

On the other hand, selection of the virtual button 902 by each (or by at least one of) users B and C causes a negative response (not shown) to the "start" notification 503A or 503B to be transmitted back to the games console 110A. This causes the games console 110A to transmit "cancel" notifications (not shown) to each games console 110B and 110C cancelling the initiation of the private conversation mode.

Figure 10B:
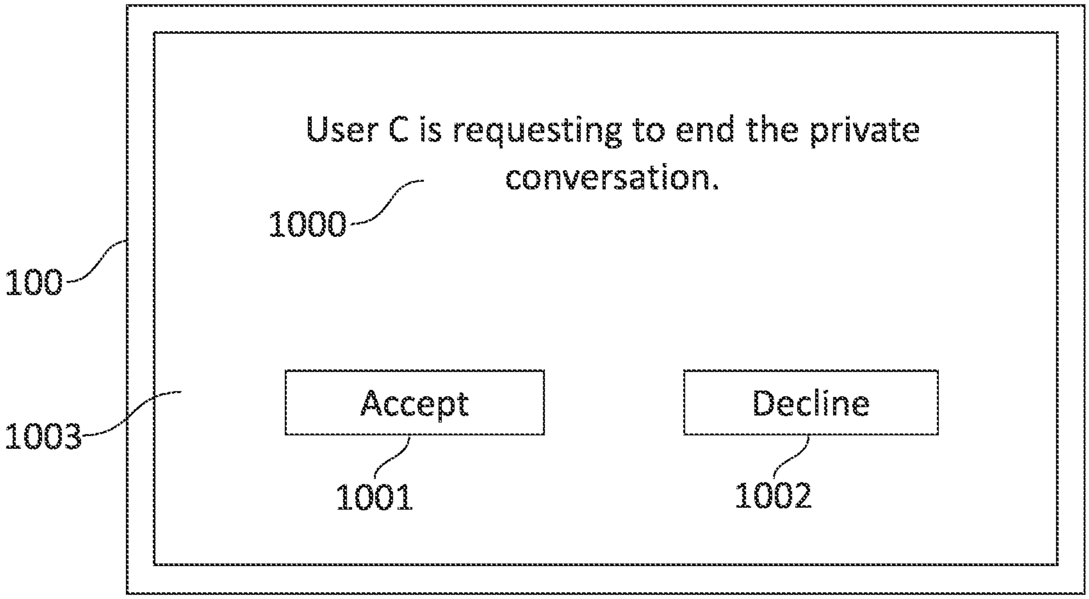

FIG. 10B shows an example which allows an ongoing private conversation mode to be ended by a user (e.g. users B or C) other than the user (e.g. user A) who initiated the private conversation mode. In this example, user C wishes the private conversation mode (initiated by user A) to end. User C requests this by, for example, pressing a predetermined button on their controller 140 or headset 307C or by using a suitable voice command detectable by their games console 110C. The request causes a "request" notification (not shown) to be transmitted to the games console 110A of user A which, in response to the "request" notification, causes a request screen 1003 to be displayed. The screen 1003 includes information 1000 indicating that user C wishes to end the private conversation mode and provides virtual buttons 1001 ("Accept") and 1002 ("Decline").

Selection of the virtual button 1001 by user A causes the private conversation mode to be ended by causing the games console 110A to transmit "end" notifications 504A and 504B to games consoles 110B and 110C. On the other hand, selection of the virtual button 1002 by user A causes a rejection response (not shown) to be transmitted back to the games console 110C and the private conversation mode is maintained.

In an example, a screen like request screen 1003 may be displayed to all other users when any one user requests that the private conversation mode is ended (e.g. through a "request" notification (not shown) transmitted to all users from the games console of the requesting user). Each user may then select the virtual button 1001 or 1002 depending on whether or not they agree that the private conversation mode should be ended. Selection of virtual button 1001 causes a "positive" response notification (not shown) to be transmitted to the games console of the user (e.g. user A) who initiated the private conversation mode. On the other hand, selection of the virtual button 1001 causes a "negative" response notification (not shown) to be transmitted to the games console of the user (e.g. user A) who initiated the private conversation mode. If a "positive" response notification is received from all users (including the user who initiated the private conversation mode), the private conversation mode is ended (e.g. through transmission of "end" notifications 504A and 504B). On the other hand, if a "negative" response notification is received from at least one user, the private conversation mode is not ended (and, for example, a "reject request" notification (not shown) is transmitted back to the user who made the request. This provides improved control to all users while also ensuring the privacy of any individual user.

Each of the examples of FIGS. 10A and 10B may also include a default option which is executed automatically after a predetermined period of time (e.g. 10 seconds). The remaining period of time before execution of the default option may be indicated on the screens 903 and 1003 via visual countdown timer, for example. In an example, the default option for FIG. 10A may be the option associated with the "Accept" virtual button 901 and the default option for FIG. 10B may be the option associated with the "Decline" virtual button 1002, thereby helping ensure user privacy in the absence of an input received from users.

In the given examples, each games console 110A, 110B and 110C indicates (e.g. via its respective display device 100) when private conversation mode is initiated and when private conversation mode is ended. While private conversation mode is initiated, a visual indicator indicating this (e.g. the words "Private Conversation Mode Enabled" or a suitable icon) may be overlaid on the video output of the game, thereby allowing each playing user to easily determine whether or not they are able to share private information with other playing users.

Figure 11:
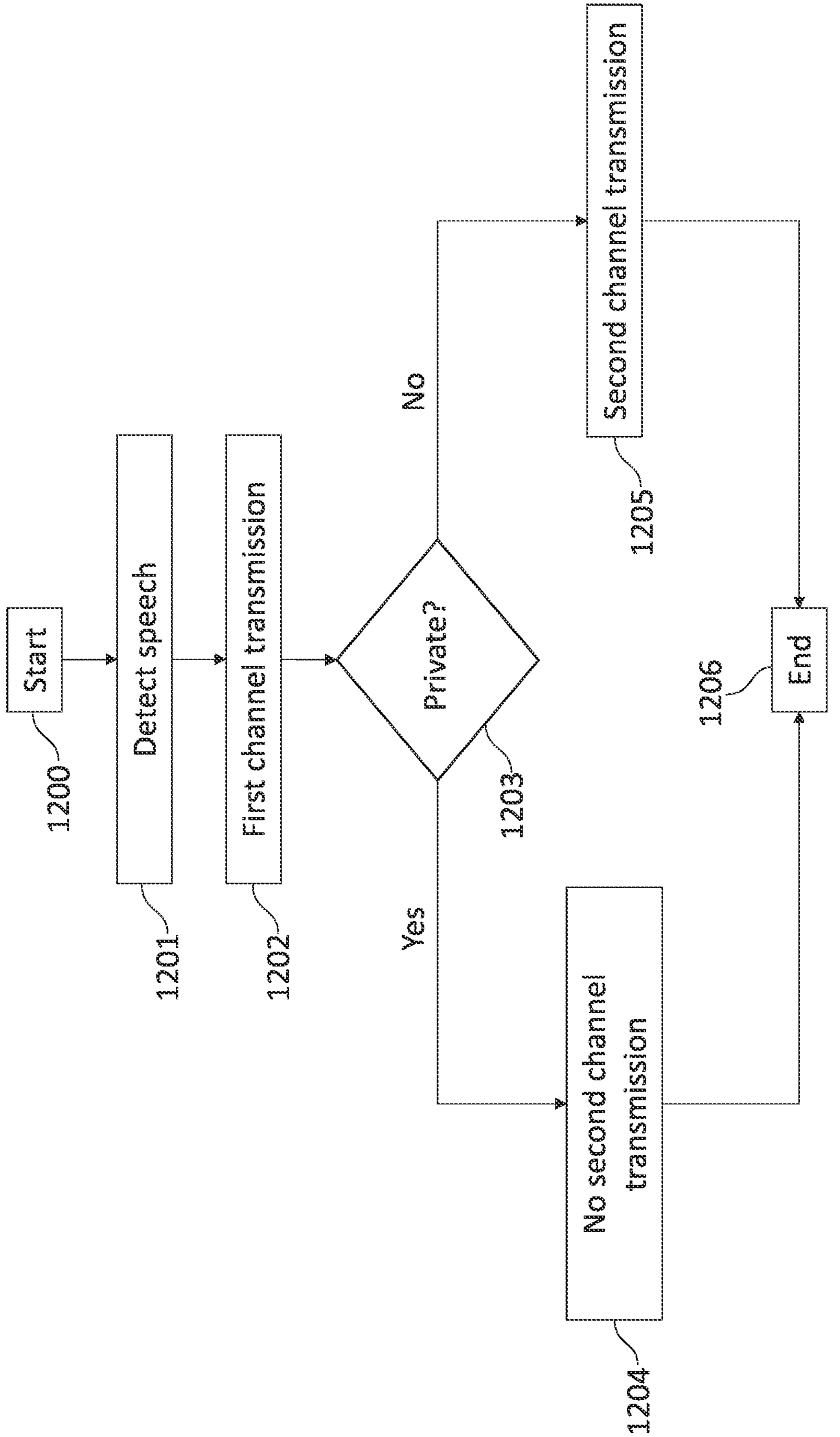
FIG. 11 shows an example method.

An example data processing method according to the present technique is shown in FIG. 11.

The method of FIG. 11 is a computer-implemented method carried out by circuitry of a data processing apparatus (e.g. the CPU 20 of games console 110A). The method starts at step 1201. At step 1201, a speech input (e.g. uttered speech 500 detected by the microphone of headset 307A) from a first user (e.g. user A) playing a video game is detected.

At step 1202, data representing the speech input is transmitted to a second data processing apparatus (e.g. games console 110B or 110C) using a first communication channel (e.g. private VoIP channel) for output to a second user (e.g. user B or user C) playing the video game with the first user.

At step 1203, it is determined whether a private conversation mode is enabled. For example, when step 1203 is implemented by games console 110A, it is determined that private conversation mode is enabled when it is detected that user A has pressed or is holding down a predetermined button, trigger or the like on controller 140 or headset 307A or if a predetermined voice command (e.g. "enter private conversation mode") has been uttered by user A. In another example, when step 1203 is implemented by games console 110B or 110C, it is determined that private conversation mode is enabled when "start" notification 503A (in the case of games console 110A) or 503B (in the case of games console 110C) is received.

If the private conversation mode is not enabled, the method proceeds to step 1204, in which data representing the speech input is transmitted to a third data processing apparatus (e.g. audience device(s) 309 via server 300) using a second communication channel (e.g. one or more RTP sessions established over the network 308 and controlled by the server 300) for output to a third user (that is, an audience member) watching but not playing the video game with the first and second users. This allows, for example, speech input from user A to be reproduced for and heard by any live stream audience member in addition to users B and C.

On the other hand, if the private conversation mode is enabled, the method proceeds to step 1205, in which the transmission of data representing the speech input to the third data processing apparatus using the second communication channel is prevented. This allows, for example, speech input from user A to be reproduced for and heard by only users B and C (and not any live stream audience member). The method ends at step 1206.

Example(s) of the present technique are defined by the following numbered clauses:

1. A data processing apparatus comprising circuitry configured to: detect a speech input from a first user playing a video game; transmit data representing the speech input to a second data processing apparatus using a first communication channel for output to a second user playing the video game with the first user; determine if a private conversation mode is enabled; if the private conversation mode is not enabled, transmit data representing the speech input to a third data processing apparatus using a second communication channel for output to a third user watching but not playing the video game with the first and second users; and if the private conversation mode is enabled, prevent transmission of data representing the speech input to the third data processing apparatus using the second communication channel.
2. A data processing apparatus according to clause 1, wherein the first communication channel is a private voice over internet protocol, VOIP, communication channel established between the data processing apparatus and second data processing apparatus.
3. A data processing apparatus according to any preceding clause, wherein the second communication channel is established between the data processing apparatus and the third data processing apparatus for transmission of live stream video game data to the third data processing apparatus.
4. A data processing apparatus according to clause 4, wherein: the data representing the speech input is combined with audio data generated by the video game to generate combined audio data; and the combined audio data is transmitted using the second communication channel.
5. A data processing apparatus according to any preceding clause, wherein the circuitry is configured to enable or disable the private conversation mode in response to a predetermined control input detected from the first user.
6. A data processing apparatus according to any preceding clause, wherein the circuitry is configured to enable or disable the private conversation mode in response to a notification received from the second data processing apparatus.

7. A data processing apparatus according to any preceding clause, wherein the circuitry is configured to: when the private conversation mode is enabled, transmit a notification to the second data processing apparatus to control the second data processing apparatus to enable the private conversation mode; and when the private conversation mode is disabled, transmit a notification to the second data processing apparatus to control the second data processing apparatus to disable the private conversation mode.
8. A data processing apparatus according to any preceding clause, wherein the circuitry is configured to: detect a second speech input from the first user or receive, from the second data processing apparatus using the first communication channel, data representing a second speech input detected from the second user; determine if the private conversation mode is to remain enabled; if the private conversation mode is not to remain enabled: disable the private conversation mode, and transmit data representing the second speech input to the third data processing apparatus using the second communication channel for output to the third user; and if the private conversation mode is to remain enabled: prevent transmission of data representing the second speech input to the third data processing apparatus using the second communication channel.
9. A data processing apparatus according to clause 8, wherein the circuitry is configured to: determine if content of the second speech input is related to content of the speech input; if content of the second speech input is related to content of the speech input, determine that the private conversation mode is to remain enabled; and if content the second speech input is not related to content of the speech input, determine that the private conversation mode is not to remain enabled.
10. A data processing apparatus according to clause 8 or 9, wherein the circuitry is configured to: determine if a time period between detection of the speech input and detection of the second speech input exceeds a predetermined threshold; if the predetermined threshold is not exceeded, determine that the private conversation mode is to remain enabled; and if the predetermined threshold is exceeded, determine that the private conversation mode is not to remain enabled.
11. A method of controlling a data processing apparatus, the method comprising controlling the data processing apparatus to: detect a speech input from a first user playing a video game; transmit data representing the speech input to a second data processing apparatus using a first communication channel for output to a second user playing the video game with the first user; determine if a private conversation mode is enabled; if the private conversation mode is not enabled, transmit data representing the speech input to a third data processing apparatus using a second communication channel for output to a third user watching but not playing the video game with the first and second users; and if the private conversation mode is enabled, prevent transmission of data representing the speech input to the third data processing apparatus using the second communication channel.
12. A program for controlling a computer to perform a method according to clause 11.
13. A storage medium storing a program according to clause 12.

Numerous modifications and variations of the present disclosure are possible in light of the above teachings. It is therefore to be understood that, within the scope of the claims, the disclosure may be practiced otherwise than as specifically described herein.

In so far as embodiments of the disclosure have been described as being implemented, at least in part, by one or more software-controlled information processing apparatuses, it will be appreciated that a machine-readable medium (in particular, a non-transitory machine-readable medium) carrying such software, such as an optical disk, a magnetic disk, semiconductor memory or the like, is also considered to represent an embodiment of the present disclosure. In particular, the present disclosure should be understood to include a non-transitory storage medium comprising code components which cause a computer to perform any of the disclosed method(s).

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more computer processors (e.g. data processors and/or digital signal processors). The elements and components of any embodiment may be physically, functionally and logically implemented in any suitable way. Indeed, the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to these embodiments. Additionally, although a feature may appear to be described in connection with particular embodiments, one skilled in the art would recognize that various features of the described embodiments may be combined in any manner suitable to implement the present disclosure.

The invention claimed is:

1. A data processing apparatus comprising circuitry configured to:

detect a speech input from a first user playing a video game;

transmit data representing the speech input to a second data processing apparatus using a private Voice over Internet Protocol (VOIP) channel of a first communication channel for output to a second user playing the video game with the first user;

determine if a private conversation mode is enabled, wherein the private conversation mode is enabled or disabled in response to a predetermined control input detected from the first user;

if the private conversation mode is not enabled, combine data representing the speech input with audio generated by the video game to produce combined audio and transmit the combined audio to a third data processing apparatus using a second communication channel for output to a third user watching but not playing the video game with the first and second users; and if the private conversation mode is enabled, prevent transmission of data representing the speech input on the second communication channel, wherein voice data on the public path is buffered during private conversation mode and, upon ending private conversation mode, is transmitted at a temporarily increased playback speed for a fixed catch-up interval to synchronize the stream, with playback speed and interval set proportional to buffer duration or by a fixed interval with a proportional speed factor.

2. The data processing apparatus according to claim 1, wherein the second communication channel is established between the data processing apparatus and the third data processing apparatus for transmission of live stream video game data to the third data processing apparatus.

3. The data processing apparatus according to claim 1, wherein:

the data representing the speech input is combined with audio data generated by the video game to generate combined audio data; and the combined audio data is transmitted using the second communication channel.

4. The data processing apparatus according to claim 1, wherein the circuitry is configured to enable or disable the private conversation mode in response to a notification received from the second data processing apparatus.

5. The data processing apparatus according to claim 1, wherein the circuitry is configured to:

when the private conversation mode is enabled, transmit a notification to the second data processing apparatus to control the second data processing apparatus to enable the private conversation mode; and when the private conversation mode is disabled, transmit a notification to the second data processing apparatus to control the second data processing apparatus to disable the private conversation mode.

6. The data processing apparatus according to claim 1, wherein the circuitry is configured to:

detect a second speech input from the first user or receive, from the second data processing apparatus using the first communication channel, data representing a second speech input detected from the second user;

determine if the private conversation mode is to remain enabled;

if the private conversation mode is not to remain enabled:

disable the private conversation mode, and transmit data representing the second speech input to the third data processing apparatus using the second communication channel for output to the third user; and if the private conversation mode is to remain enabled:

prevent transmission of data representing the second speech input to the third data processing apparatus using the second communication channel.

7. The data processing apparatus according to claim 6, wherein the circuitry is configured to:

determine if content of the second speech input is related to content of the speech input;

if content of the second speech input is related to content of the speech input, determine that the private conversation mode is to remain enabled; and if content the second speech input is not related to content of the speech input, determine that the private conversation mode is not to remain enabled.

8. The data processing apparatus according to claim 6, wherein the circuitry is configured to:

determine if a time period between detection of the speech input and detection of the second speech input exceeds a predetermined threshold;

if the predetermined threshold is not exceeded, determine that the private conversation mode is to remain enabled; and if the predetermined threshold is exceeded, determine that the private conversation mode is not to remain enabled.

9. A method of controlling a data processing apparatus, the method comprising controlling the data processing apparatus to:

detect a speech input from a first user playing a video game;

transmit data representing the speech input to a second data processing apparatus using a private Voice over Internet Protocol (VOIP) channel of a first communication channel for output to a second user playing the video game with the first user;

determine if a private conversation mode is enabled, wherein the private conversation mode is enabled or disabled in response to a predetermined control input detected from the first user;

if the private conversation mode is not enabled, combine data representing the speech input with audio generated by the video game to produce combined audio and transmit the combined audio to a third data processing apparatus using a second communication channel for output to a third user watching but not playing the video game with the first and second users; and if the private conversation mode is enabled, prevent transmission of data representing the speech input on the second communication channel, wherein voice data on the public path is buffered during private conversation mode and, upon ending private conversation mode, is transmitted at a temporarily increased playback speed for a fixed catch-up interval to synchronize the stream, with playback speed and interval set proportional to buffer duration or by a fixed interval with a proportional speed factor.

10. A non-transitory computer-readable storage medium storing a program for controlling a computer to perform a method comprising:

detecting a speech input from a first user playing a video game;

transmitting data representing the speech input to a second data processing apparatus using a private Voice over Internet Protocol (VOIP) channel of a first communication channel for output to a second user playing the video game with the first user;

determining if a private conversation mode is enabled, wherein the private conversation mode is enabled or disabled in response to a predetermined control input detected from the first user;

if the private conversation mode is not enabled, combining data representing the speech input with audio generated by the video game to produce combined audio and transmitting the combined audio to a third data processing apparatus using a second communication channel for output to a third user watching but not playing the video game with the first and second users; and if the private conversation mode is enabled, preventing transmission of data representing the speech input on the second communication channel, wherein voice data on the public path is buffered during private conversation mode and, upon ending private conversation mode, is transmitted at a temporarily increased playback speed for a fixed catch-up interval to synchronize the stream, with playback speed and interval set proportional to buffer duration or by a fixed interval with a proportional speed factor.

11. The data processing apparatus of claim 1, wherein when private conversation mode is enabled, a subsequent player utterance is classified as a response using keyword matching and a trained language model, and private conversation mode is maintained for the response; otherwise private conversation mode ends, and the classification is weighted by elapsed time between utterances and maintains private conversation mode when a classification value remains at or above a threshold.

12. The data processing apparatus of claim 1, wherein a live alert indicating time remaining before private conversation mode ends is displayed and resets upon detection of further speech during a private conversation mode interval, and notifications are transmitted to other player devices to synchronize alert resets across devices.

* * * * *